Dec. 29, 1931.  H. C. EDDY  1,838,375
TREATER FOR INTERMITTENTLY TREATING FLUID
Filed Nov. 14, 1927
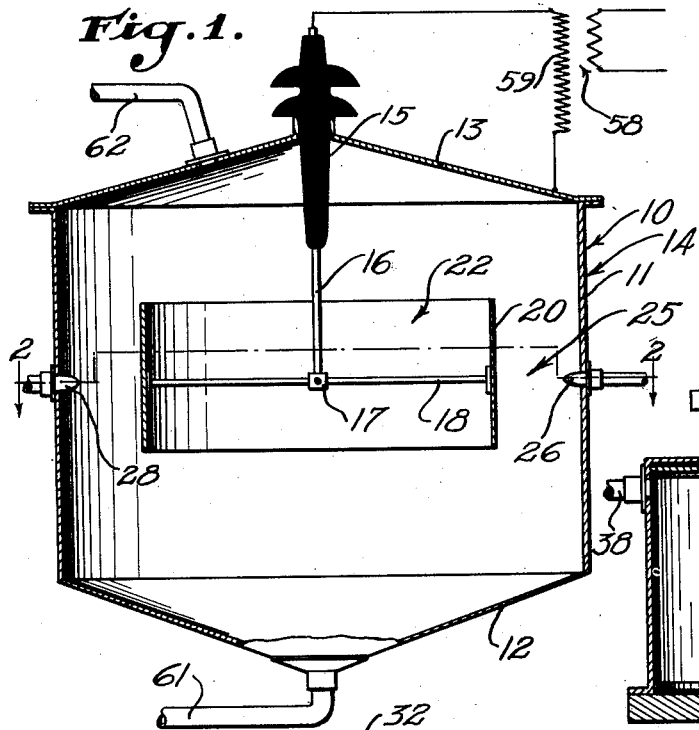
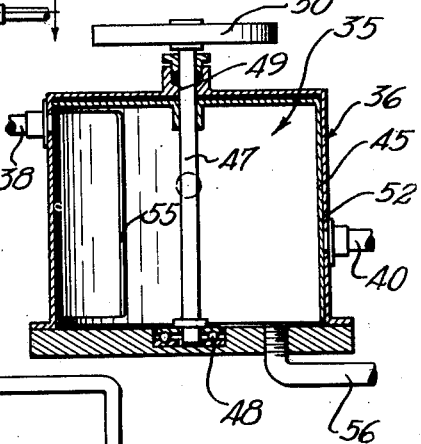
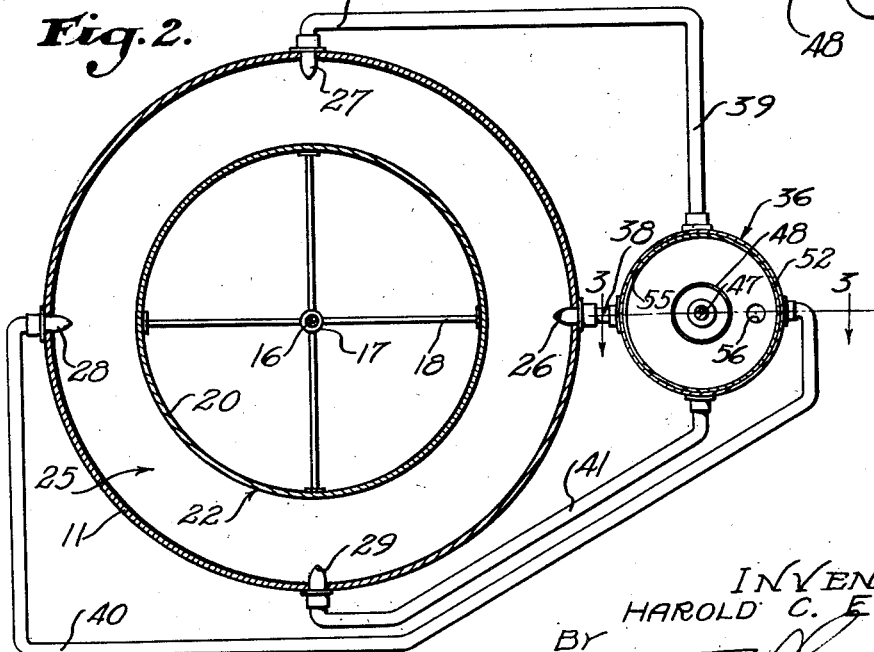
INVENTOR:
HAROLD C. EDDY,
BY
ATTORNEY.

Patented Dec. 29, 1931

1,838,375

UNITED STATES PATENT OFFICE

HAROLD C. EDDY, OF LOS ANGELES, CALIFORNIA, ASSIGNOR TO PETROLEUM RECTIFYING COMPANY OF CALIFORNIA, OF LOS ANGELES, CALIFORNIA, A CORPORATION OF CALIFORNIA

TREATER FOR INTERMITTENTLY TREATING FLUID

Application filed November 14, 1927. Serial No. 233,024.

My invention relates to electrical treaters which are used for treating mixtures when it is desired to separate the constituents thereof.

My invention finds a peculiar utility in separating the water from oil-and-water mixtures and it is in this connection that I shall particularly describe it without limiting myself thereto.

In the petroleum industry it is common for water and oil to become intermixed. It is necessary to separate these constituents before the pure oil can be marketed. One method of separating these two constituents is to break down the emulsion by the use of an electric treater which subjects the mixture to the action of an electric field, thus coalescing the particles of water into masses of sufficient size to separate from the oil by the influence of gravity.

It is an object of this invention to provide a simple and improved electrical treater.

Another object of the invention is to provide a treater in which the fluid to be treated is intermittently supplied to the treating space.

Still another object of my invention is to provide a treater in which no short-circuiting will occur between the electrodes.

Still a further object of this invention is to provide a novel method of treating an emulsion by supplying this emulsion intermittently to a treating space, as well as to provide a novel method wherein the emulsion is successively introduced into the treating space at a plurality of different points.

Other objects and advantages will become apparent in the following description.

The preferred form of my invention is shown in the drawings, in which—

Fig. 1 is a vertical cross-sectional view of one form of my invention.

Fig. 2 is a horizontal sectional view taken along the line 2—2 of Fig. 1, this view also showing the distributor of my invention.

Fig. 3 is a vertical sectional view of the distributor of my invention.

Referring in particular to the drawings, the invention provides a shell 10 having a cylindrical side wall 11 closed at its lower end by a bottom member 12 and at its upper end by a top member 13. The shell 10 comprises a primary electrode 14 of my invention.

Extending through the top member 13 is an insulator 15 through which a rod 16 extends. The rod 16 carries at its lower end a hub 17 from which arms 18 extend outward to support a cylindrical plate 20. The cylindrical plate 20 comprises a secondary electrode 22 of my invention, there being a treating space 25 between the primary electrode 14 and the secondary electrode 22.

Extending through the side wall 11 of the primary electrode 14 are four nozzles, 26 to 29 inclusive, which are adapted to supply a fluid to be treated into the treating space 25 and to impinge this fluid on the secondary electrode 22.

A distributor 35 of my invention is adapted to supply this fluid to be treated to the nozzles 26 to 29 inclusive. The distributor comprises a shell 36 having pipes 38 to 41 inclusive communicating with the interior thereof, these pipes connecting respectively to the nozzles 26 to 29. As best shown in Fig. 2, these pipes are equally spaced around the periphery of the shell 36, and may also be adapted to communicate with the shell 36 at different levels thereof, as shown in Fig. 3. Adapted to rotate in the shell 36 is a drum 45. The drum 45 is secured at its upper end to a shaft 47, the lower end of which journals in a bearing 48 in the lower portion of the shell 36. The upper end of the shaft 47 extends through a stuffing box 49 and has a pulley 50 or other suitable driving means connected thereto. The drum 45 has a cylindrical wall 52 which is adapted to rotate immediately adjacent to the interior surface of the shell 36. Formed through the cylindrical wall 52 is an opening 55 which is adapted to allow successive communication between the interior of the drum 45 and the pipes 38 to 41 inclusive. The fluid to be treated is supplied to the interior of the drum 45 by a supply pipe 56 which extends into the lower wall of the shell 36. As the shaft 47 is rotated, the drum 45 is rotated therewith and allows the fluid passing through the fluid-supply pipe 56 to successively pass through the pipes 38 to 41, this fluid being projected into the treating space 25 through the nozzles 26 to 29 respectively.

I prefer to have the opening 55 of such a size that fluid will be supplied through one of the pipes 38 to 41 inclusive up to the instant that it is supplied through the succeeding pipe. It is also entirely possible to make the opening 55 narrower so that fluid may be supplied to one of the pipes 38 to 41, this flow of fluid being then stopped by a further revolution of the drum 45 and again started through another of the pipes after an appreciable lapse of time. In the latter event fluid would not only be supplied to the nozzles 26 to 29 successively, but there would be a time interval of no flow between the flow of fluid from successive nozzles.

The operation of my invention is as follows:

An electric field is established between the primary and secondary electrodes 14 and 22 by means of a transformer 58 having a secondary 59 electrically connected to these electrodes. Fluid to be treated is then supplied to the supply pipe 56 and the shaft 47 is then turned by means of the pulley 50. The fluid to be treated is supplied successively to the nozzles 26 to 29 inclusive, as above described. This fluid enters the treating space 25 and is acted upon by the electric field therein. This electric field agglomerates the particles of water into masses of sufficient size to gravitate from the fluid being treated, these particles falling in the treating space 25 and being deposited in the lower portion of the shell 10 from which they may be removed by means of a pipe 61. The clear oil rises to the top of the shell 10 and may be drawn off through a pipe 62 communicating therewith.

The fluid entering any one of the nozzles 26 to 29 flows across the treating space 25 and impinges upon the secondary electrode 22. This flow occurs over a relatively short period of time, during which time a charge of the fluid is forced into the treating space 25 immediately adjacent to the nozzle supplying the fluid. This wet fluid is immediately subjected to the action of the electric field and forms a path of least resistance through the treating space 25. Before any short-circuiting can occur, however, the flow of fluid through this particular nozzle is stopped and is transferred to another of the nozzles. Thus, the body of fluid forced through the first nozzle will be gradually separated into its constituents, during which time the flow of fluid is transferred to the other nozzles.

It should be apparent that the path of least resistance through the treating space occurs at the nozzle which is at that instance supplying fluid to the treating space. Thus, this path of least resistance is transferred to different parts of the treating space and is quickly formed into a path of higher resistance due to the action of the electric field on the fluid introduced.

Various modifications might be made without departing from the spirit of my invention. For instance the distributor 35 might be connected to the nozzles so as to supply fluid through the nozzles in the sequence 26, 28, 27, and 29 instead of in the sequence following a given direction around the shell 10, as previously described. So, also, any form of distributor might be used with the treater of my invention without departing from the spirit of the invention.

The feature of impinging a stream of emulsion onto an electrode of opposite polarity is not in itself a part of the present invention except as it is combined with an intermittent supply of emulsion to the nozzle, this feature being broadly claimed in my copending application Serial No. 233,023.

I claim as my invention:

1. An electrical treater, comprising: a primary electrode; a secondary electrode, there being a treating space between said electrodes; and means for intermittently introducing a fluid into said treating space.

2. An electrical treater, comprising: a primary electrode; a secondary electrode, there being a treating space between said electrodes; and means for intermittently introducing a fluid into said treating space at each of a plurality of different points.

3. An electrical treater, comprising: a primary electrode; a secondary electrode, there being a treating space between said electrodes; nozzles mounted in spaced relationship, said nozzles being adapted to supply a fluid into said treating space; and means for intermittently supplying fluid to each of said nozzles.

4. An electrical treater, comprising: a primary electrode; a secondary electrode, there being a treating space between said electrodes; nozzles mounted in said primary electrode, said nozzles being adapted to supply a fluid into said treating space; and means for intermittently supplying fluid to each of said nozzles.

5. An electrical treater, comprising: a primary electrode; a secondary electrode, there being a treating space between said electrodes; fluid-supply means communicating with different portions of said treating space; and means for successively supplying fluid to said fluid-supply means.

6. An electrical treater, comprising: a primary electrode; a secondary electrode, there being a treating space between said electrodes; nozzles adapted to supply a fluid to different sections of said treating space; and means for intermittently and successively supplying fluid to said nozzles.

7. A combination as defined in claim 4 in which said nozzles are adapted to impinge fluid on said secondary electrode.

8. An electrical treater, comprising: a shell forming a primary electrode; a secondary electrode insulated from, and supported in, said shell; means for establishing an electric field in a treating space between said electrodes; nozzles directed into said treating space; and means for intermittently supplying a fluid to each of said nozzles.

9. An electrical treater, comprising: a shell forming a primary electrode; a secondary electrode insulated from, and supported in, said shell; means for establishing an electric field in a treating space between said electrodes; nozzles mounted in said shell and directed into said treating space; and means for intermittently supplying a fluid to each of said nozzles.

10. An electrical treater, comprising: a shell forming a primary electrode; a secondary electrode insulated from, and supported in, said shell; means for establishing an electric field in a treating space between said electrodes; nozzles directed into said treating space; and means for successively supplying a fluid to said nozzles.

11. A method of breaking emulsions, which includes the steps of: setting up an electric field; and intermittently introducing emulsion into said field at a given section.

12. A method of breaking emulsions, which includes the steps of: setting up an electric field; introducing a charge of emulsion at a primary point in said field; and subsequently introducing another charge of emulsion at a secondary point in said field.

13. A method of breaking emulsions, which includes the steps of: setting up an electric field; and distributing a substantially constant stream of emulsion to different sections of said field in succession.

14. A method of breaking an emulsion, which includes the steps of: setting up an electric field; introducing into said electric field an emulsion having a short-circuiting tendency; and shutting off the supply of said emulsion after a relatively short period of time and before any short-circuiting of said field can take place adjacent the section at which said emulsion was introduced.

15. A method of breaking an emulsion, which includes the steps of: setting up an electric field; introducing into said electric field an emulsion having a short-circuiting tendency; shutting off the supply of said emulsion after a relatively short period of time and before any short-circuiting of said field can take place adjacent the section at which said emulsion was introduced; and again supplying emulsion to said field at said section after short-circuiting danger from the emulsion first introduced has passed.

16. A method which includes the steps of: setting up an electric field; introducing into said field at different sections thereof streams of an emulsion having short-circuiting tendencies if supplied continuously to said field; and stopping the flow at each section before actual short-circuting occurs at this section.

17. In an electrical treater, the combination of: walls defining a treating space in which an electric field is established; a nozzle directed into said treating space; and a fluid-control means communicating with said nozzle and intermittently supplying fluid to said nozzle at regular intervals.

In testimony whereof, I have hereunto set my hand at Los Angeles, California, this 8th day of November, 1927.

HAROLD C. EDDY.